United States Patent
Karki et al.

(10) Patent No.: US 10,176,616 B2
(45) Date of Patent: Jan. 8, 2019

(54) AUTOMATIC CAPTURE AND REFINEMENT OF A DIGITAL IMAGE OF A GROUP OF PEOPLE WITHOUT USER INTERVENTION

(71) Applicant: Adobe Systems Incorporated, San Jose, CA (US)

(72) Inventors: Krishna Singh Karki, New Delhi (IN); Vaibhav Jain, Lucknow (IN); Subham Gupta, Uttarakhand (IN); Poonam Bhalla, New Delhi (IN); Ajay Bedi, Hamirpur (IN)

(73) Assignee: Adobe Inc., San Jose, CA (US)

(*) Notice: Subject to any disclaimer, the term of this patent is extended or adjusted under 35 U.S.C. 154(b) by 59 days.

(21) Appl. No.: 15/410,635

(22) Filed: Jan. 19, 2017

(65) Prior Publication Data

US 2018/0204097 A1    Jul. 19, 2018

(51) Int. Cl.
| | |
|---|---|
| *H04N 5/262* | (2006.01) |
| *G06T 11/60* | (2006.01) |
| *G06K 9/00* | (2006.01) |
| *G06T 7/33* | (2017.01) |
| *G06T 7/00* | (2017.01) |
| *G06K 9/62* | (2006.01) |
| *H04N 5/235* | (2006.01) |

(52) U.S. Cl.
CPC .......... *G06T 11/60* (2013.01); *G06K 9/00248* (2013.01); *G06K 9/00281* (2013.01); *G06K 9/00308* (2013.01); *G06K 9/00744* (2013.01); *G06K 9/6201* (2013.01); *G06T 7/337* (2017.01); *G06T 7/97* (2017.01); *G06T 2207/10004* (2013.01); *G06T 2207/30201* (2013.01)

(58) Field of Classification Search
CPC .............. G06T 7/337; G06T 11/60; G06T 2207/30201; G06T 2207/10004; G06K 9/00744; G06K 9/00308; G06K 9/00248; G06K 9/00281
See application file for complete search history.

(56) References Cited

U.S. PATENT DOCUMENTS

| | | | | |
|---|---|---|---|---|
| 8,280,115 | B2 * | 10/2012 | Matsumura | G06T 7/223 345/633 |
| 9,036,069 | B2 * | 5/2015 | Wu | H04N 5/23219 348/333.02 |
| 9,060,158 | B2 * | 6/2015 | Shibagami | H04N 1/2112 |
| 9,413,922 | B2 * | 8/2016 | Song | H04N 1/387 |
| 9,767,533 | B2 * | 9/2017 | Bedi | G06K 9/6201 |
| 9,807,301 | B1 * | 10/2017 | Weisberg | H04N 5/23222 |
| 9,830,727 | B2 * | 11/2017 | Henry | G06T 11/60 |

(Continued)

*Primary Examiner* — Ngoc Yen T Vu
(74) *Attorney, Agent, or Firm* — Wolfe-SBMC

(57) ABSTRACT

Various embodiments receive frames as a stream captured during a camera session. During the camera session, faces and facial features of each face are detected from the frames. Then, each face in each frame is assigned a score based on the detected facial features. Using the scores, a candidate frame is selected for each individual face to represent a "best" representation of that face. In addition, an overall score is calculated for each frame based on a combination of assigned scores for the faces in the frame. Then, a reference frame is located from the frames based on the overall score for a respective frame. Faces from the candidate frames are then merged onto the reference frame, and an output image is generated for display.

20 Claims, 11 Drawing Sheets

(56) References Cited

U.S. PATENT DOCUMENTS

| | | | | |
|---|---|---|---|---|
| 9,838,641 | B1* | 12/2017 | Lim | H04N 5/77 |
| 2004/0223649 | A1* | 11/2004 | Zacks | G06T 11/00 |
| | | | | 382/218 |
| 2011/0013038 | A1* | 1/2011 | Kim | G06K 9/00228 |
| | | | | 348/222.1 |
| 2012/0099783 | A1* | 4/2012 | Bourdev | H04N 5/23219 |
| | | | | 382/159 |
| 2012/0300092 | A1* | 11/2012 | Kim | H04N 1/215 |
| | | | | 348/222.1 |
| 2017/0352178 | A1* | 12/2017 | Katz | G06T 13/40 |

* cited by examiner

AUTOMATIC CAPTURE AND REFINEMENT OF A DIGITAL IMAGE OF A GROUP OF PEOPLE WITHOUT USER INTERVENTION

BACKGROUND

Conventional image capture techniques used to capture a "perfect" group image are challenging for a variety of reasons. For example, a photographer may attempt to capture a digital image (also referred to as images in the following) of a group of people (also referred to herein as a group image). The group of people, however, may not all be smiling or looking at the camera at the same moment. To address this, multiple images are generally captured by the photographer in the hopes that one of these images capture the perfect group image. This process can be tedious and can test the patience of the photographer as well as people in the image. After capture, a photographer is then forced to manually browse through the multiple captured images to select the "best" image, which can also be a time-consuming process. Further, there is no guarantee that any of the captured images are suitable for each person in the image, e.g., that all the people are smiling and looking at the camera.

Some conventional techniques utilize post-processing techniques that allow a user to interact with image editing tools to synthesize a perfect group image. However, use of conventional image editing tools can be a time consuming manual process and generally requires a high level of expertise, which average users typically lack. These and other challenges in the conventional techniques can lead to user frustration.

SUMMARY

Techniques and systems are described to automatically capture and refine a digital image of a group of people without user intervention. A user (e.g., photographer) of a camera, for instance, can simply initiate a group image capture mode on the camera, and point the camera towards the group of people. The camera can then automatically analyze the group of people over a period of time to determine a "best" moment for each person in the group, and then output a single image that includes a "best" pose and position for each person in a single digital image. In this way, the user can capture the "perfect" group image on the fly, and without any time consuming, post-processing operations.

In one example, frames are received as a stream captured in real time during a camera session. During the camera session, faces and facial features of each face are detected from the frames. Then, each face in each frame is assigned a score based on the detected facial features. Using the scores, a candidate frame is selected for each individual face to represent a "best" representation of that face. In addition, an overall score is calculated for each frame based on a combination of assigned scores for the faces in the frame. Then, a reference frame is located from the frames based on the overall score for a respective frame. Faces from the candidate frames are then merged onto the reference frame, and an output image is generated for display.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
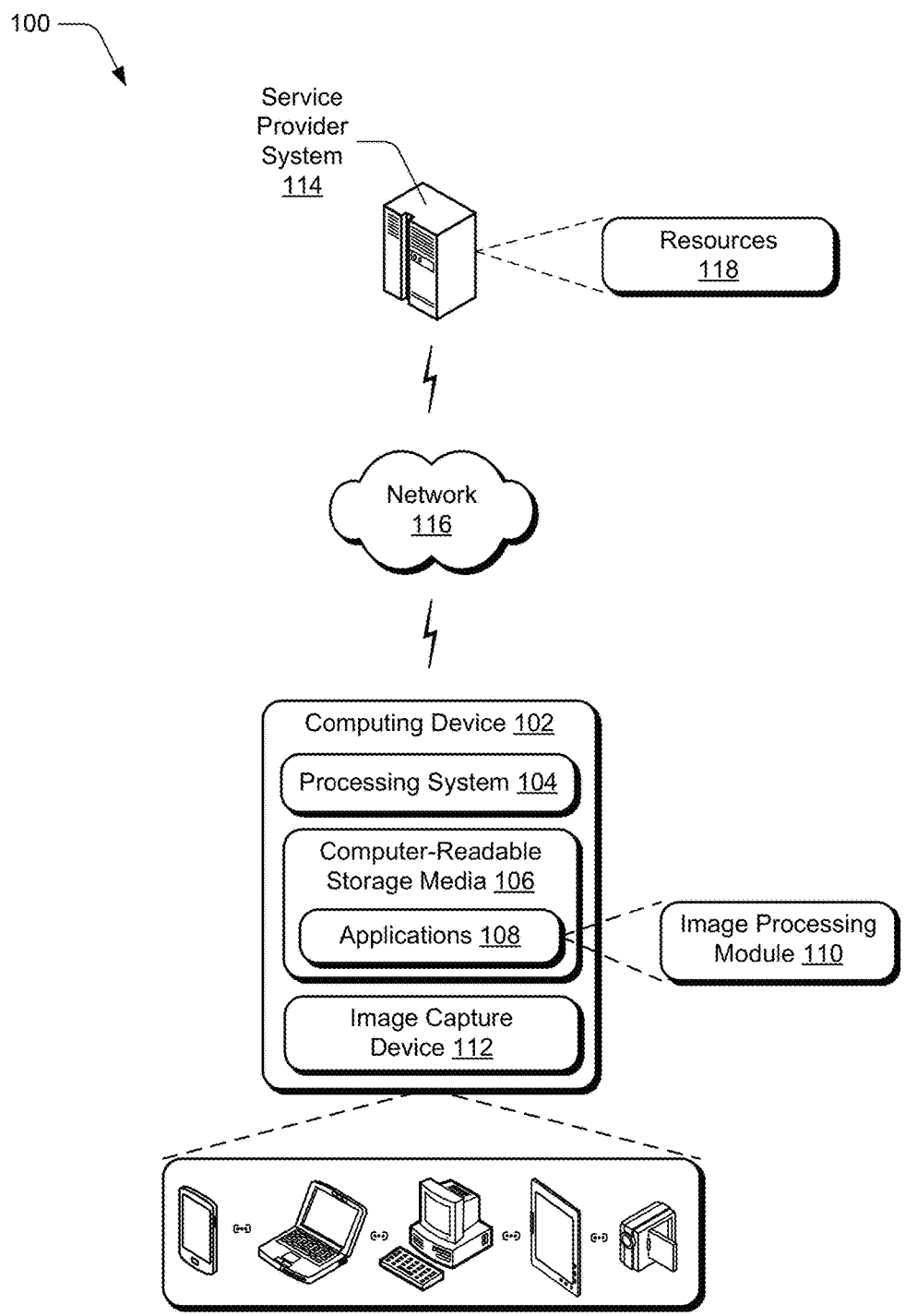
FIG. 1 is an illustration of a digital medium environment in an example implementation that is operable to employ group digital image techniques described herein.

Capturing the perfect group image with a still camera is challenging at least because some people in the group may not be smiling or looking toward the camera at the same moment. In addition, some people may have their eyes closed when the image is captured. Conventional techniques that rely on capture of multiple images and then manually selection of a "best" image can be time consuming and tedious, and there is no guarantee that any of the multiple images captured are free from the above-described problems. Further, post-processing of the multiple images with image editing tools to synthesize the perfect group image can be time consuming and generally requires a high level of expertise, which average users lack.

Accordingly, techniques are described in the following for automatic capture and refinement of a digital image of a group of people without user intervention. These techniques identify faces in frames received as a stream during a camera session, and assign scores to each face in each frame based on various factors associated with facial features (e.g., eyes, chin, lips, etc.) of the face. Some example factors include smile, head tilt, eyes open, and so on. The score for each face indicates a level of quality of the face in the group image, such as whether the person is smiling, has their eyes open, or is looking toward the camera, or a combination thereof.

For each individual face, a candidate frame is selected to represent a "best" pose and position of that face based on the score of that face in the frame. For example, the score of a particular face in a received frame is compared with a corresponding face's score in a preview frame, and the frame with the relatively higher score is selected and cached as the candidate frame for that particular face. A separate candidate frame may be selected for each face. Further, in one example each candidate frame continues to update as new frames are received during the camera session until each of the faces have candidate frames with associated scores above a threshold value for a respective face.

In addition, an overall score is calculated for each frame based on a combination of assigned scores for the faces in the frame. The overall score indicates an overall level of quality of poses and positions of all the faces in the group image. For instance, a first frame including two or more people in the group smiling may have a relatively higher overall score than a second frame having only one person in the group smiling. In implementations, a selected reference frame represents a maximum relative number of faces with highest relative scores.

Once a candidate frame is selected for each face and a reference frame is located, the candidate frames are aligned with the reference frame. For example, a particular person's head and body in the candidate frame is aligned with the same person's head and body in the reference frame effective to enable the particular person's face in the candidate frame to be merged (e.g., mapped and copied) to the reference frame. Then, the candidate frames are merged with the reference frame. For example, each face represented by a candidate frame is copied from the candidate frame to the reference frame. Subsequently, an output image is automatically generated for display that includes a group image having the "best" representation of each face captured during the camera session. This process is performed automatically and without user intervention during the camera session. Using these techniques, the user can easily capture group images, on the fly, that have all the people in the group smiling and looking toward the camera with their eyes open, even if all the people in the group don't smile or look toward the camera at the same moment.

As used herein, the term "camera session" may refer to a mode in which a camera generates a preview of a scene in real time to allow a user to manually initiate capture of a still image or a video. During the camera session, frames can be cached and analyzed in real time using the techniques described herein to identify faces of people in the frames.

As used herein, the term "landmark" (also referred to herein as "facial features") may refer to prominent features of a face. Some example landmarks include, lips, mouth, chin, cheeks, eyes, nose, and so on. The landmarks, or facial features, can be detected using facial recognition techniques in image processing. In implementations, the landmarks are usable to determine one or more factors, such as whether a person in an image is smiling, whether the person's head is tilted, whether the person's eyes are open or closed, and so on. Accordingly, the term landmark can include a variety of different facial features of a face that can be detected in an image using facial recognition techniques.

In the following discussion, an example digital medium environment is first described that can employ the techniques described herein. Example implementation details and procedures are then described which can be performed in the example digital medium environment as well as other environments. Consequently, performance of the example procedures is not limited to the example environment and the example environment is not limited to performance of the example procedures. Finally, an example system and device are described that are operable to use the techniques and systems described herein in accordance with one or more implementations.

Example Digital Medium Environment

FIG. 1 is an illustration of a digital medium environment 100 in an example implementation that is operable to utilize techniques for automatic capture and refinement of a group image without user intervention. As used herein, the term "digital medium environment" refers to the various computing devices and resources that can be utilized to implement the techniques described herein. The illustrated digital medium environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein.

In at least some implementations, the applications 108 include or otherwise make use of an image-processing module 110. In some implementations, the image-processing module 110 is a standalone application. In other implementations, the image-processing module 110 is included as part of another application or system software such as a computing device's operating system.

The image-processing module 110 is configured to automatically capture and refine group images without user intervention. The image-processing module 110 is configured to detect faces in a live camera feed, and cache a candidate frame for each face to represent an acceptable position for the face based on detected facial features. Then, the image-processing module 110 is configured to merge the "best" faces from the candidate frames onto a reference frame to generate an output image for display via a display device of the computing device as described above and below.

This constitutes an improvement over conventional approaches which capture multiple group images and then use a primarily manual post-processing approach to select a "best" image from multiple captured images. This also constitutes a further improvement over conventional approaches which rely on post-processing image editing techniques to synthesize a group image by copying portions of other captured images. The automated nature of the described implementations provides a fast, efficient, and easily scalable solution, as discussed below in more detail.

The computing device 102 can also include an image capture device 112 that enables an end user to present a live camera feed and capture still images and/or video of a scene. The image capture device 112 can include any of a wide variety of devices, such as a camera phone, a digital camera, a webcam, and so on. Generally, the image capture device 112 provides a live camera feed to the computing device 102 for display via a display device. The image capture device 112 can create a camera session using one or more application program interfaces (APIs). In implementations, preview and capture resolutions for the image capture device 112 are preset, and the preview can run at 30 fps (frames per second). However, any suitable fps setting can be used. In at least one implementation, the preview and/or capture resolutions can be selected based on user input. The image capture device 112 can also include one or more of the applications 108, such as image editing applications, and/or the image-processing module 110.

The computing device 102 may be configured in a variety of ways. For example, the computing device 102 may be configured as a desktop computer, a laptop computer, a television, a mobile device (e.g., assuming a handheld configuration such as a tablet or mobile phone), a tablet, a digital camera, and so forth. Additionally, although a single computing device 102 is shown, the computing device 102 may be representative of a plurality of different devices to perform operations "over the cloud" as further described in relation to FIG. 11.

Although functionality of the image-processing module 110 is illustrated as implemented locally on the computing device 102, the functionality of the image-processing module 110 may also be implemented in whole or in part via a service provider system 114 via a network 116. The service provider system 114 is configured to communicate with the computing device 102 over the network 116, such as the Internet, to provide a "cloud-based" computing environment. Generally speaking, the service provider system 114 is configured to make various resources 118 available over the network 116 to a user of the computing device 102. The resources 118 can include any suitable combination of services and/or content typically made available over a network by one or more providers. Some examples of services include, but are not limited to, a social networking service, a messaging service, an image sharing service, and so forth.

Although the network 116 is illustrated as the Internet, the network may assume a wide variety of configurations. For example, the network 116 may include a wide area network (WAN), a local area network (LAN), a wireless network, a public telephone network, an intranet, and so on. Further, although a single network 116 is shown, the network 116 may be representative of multiple networks.

Example Image-Processing Module

Figure 2:
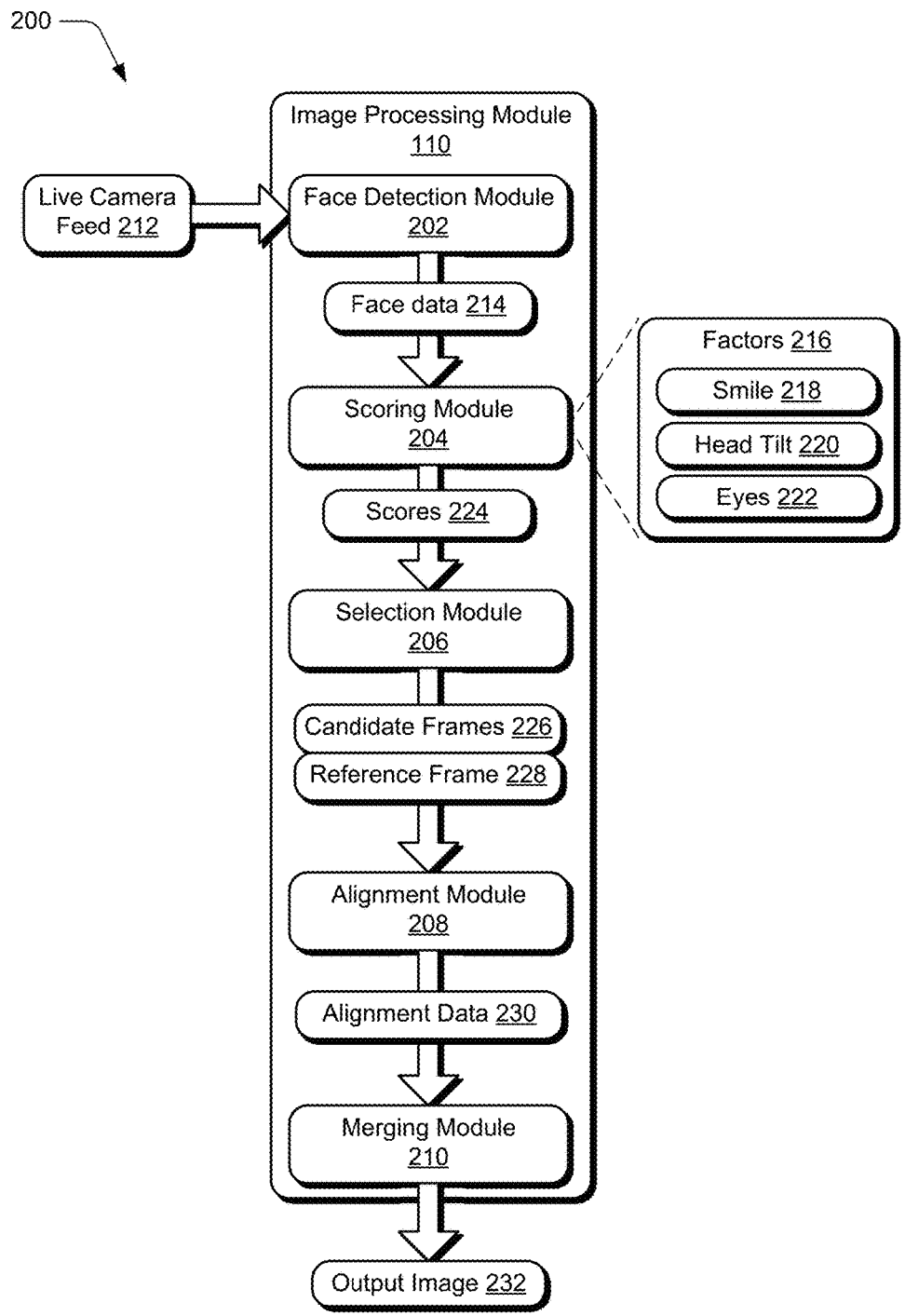
FIG. 2 illustrates an example image-processing module in accordance with one or more implementations.
Figure 3:
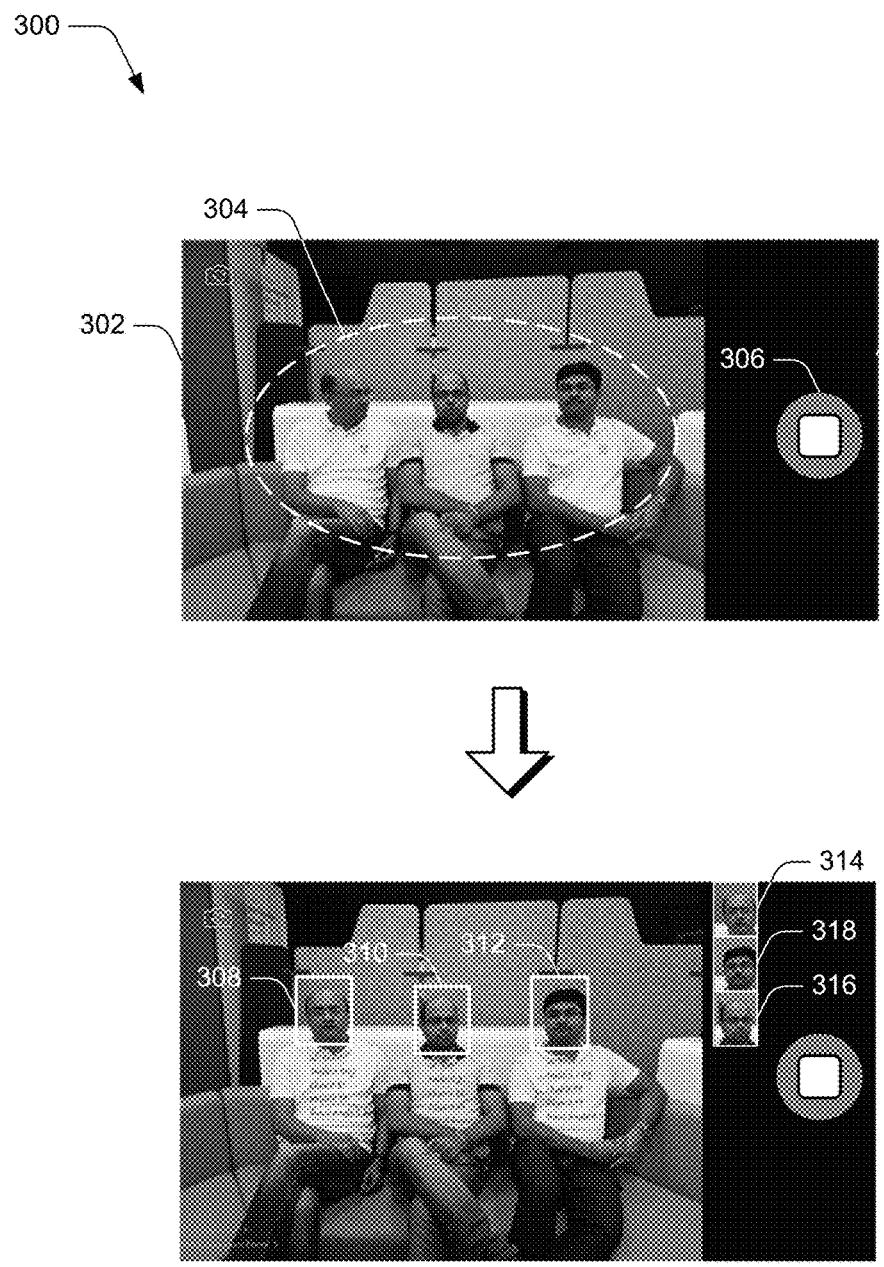
FIG. 3 illustrates an example implementation of initiating a camera session for automatic capture and refinement of a group image in accordance with one or more embodiments.
Figure 4:
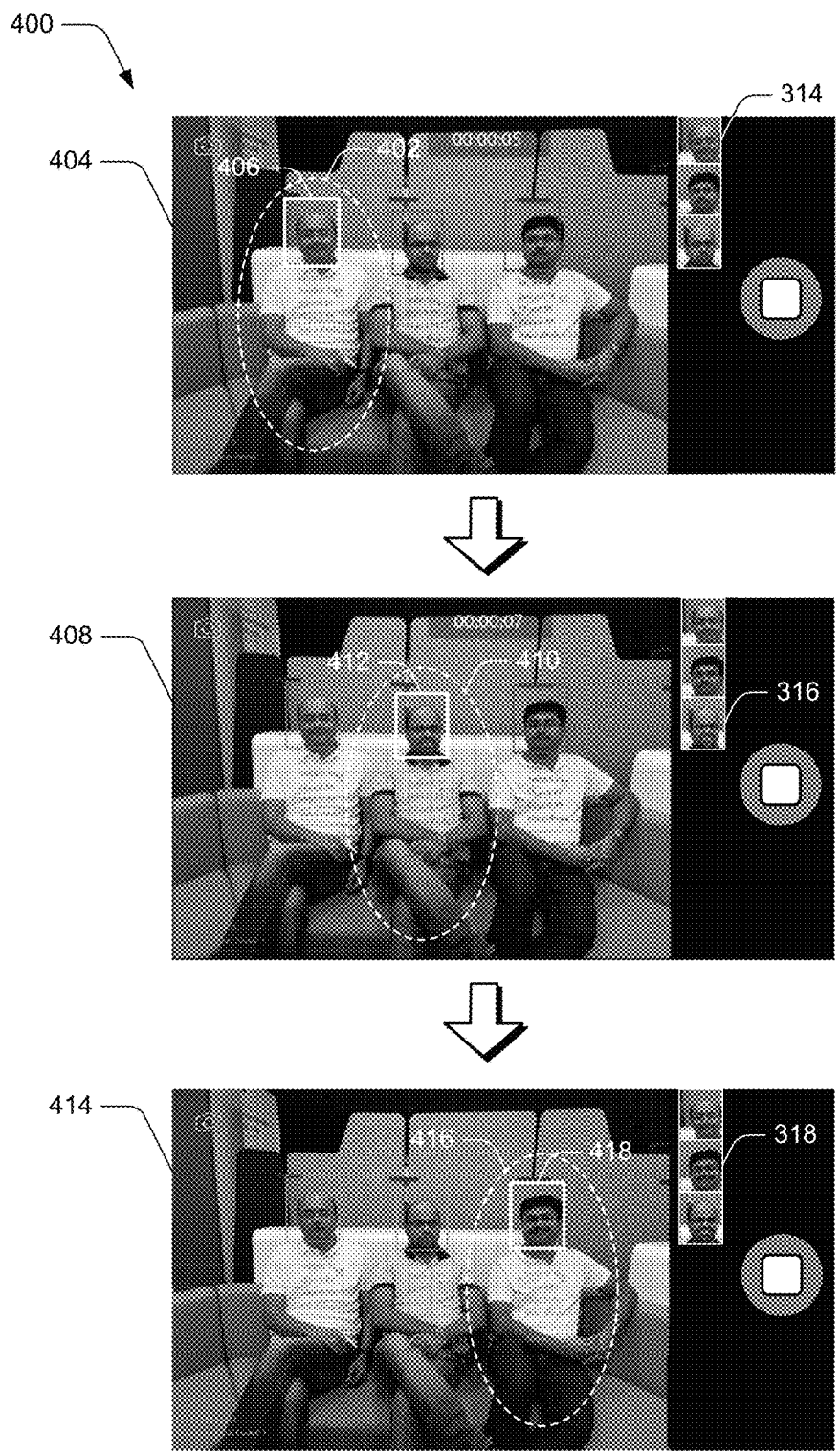
FIG. 4 illustrates an example implementation of updating candidate frames in accordance with one or more embodiments.
Figure 5:
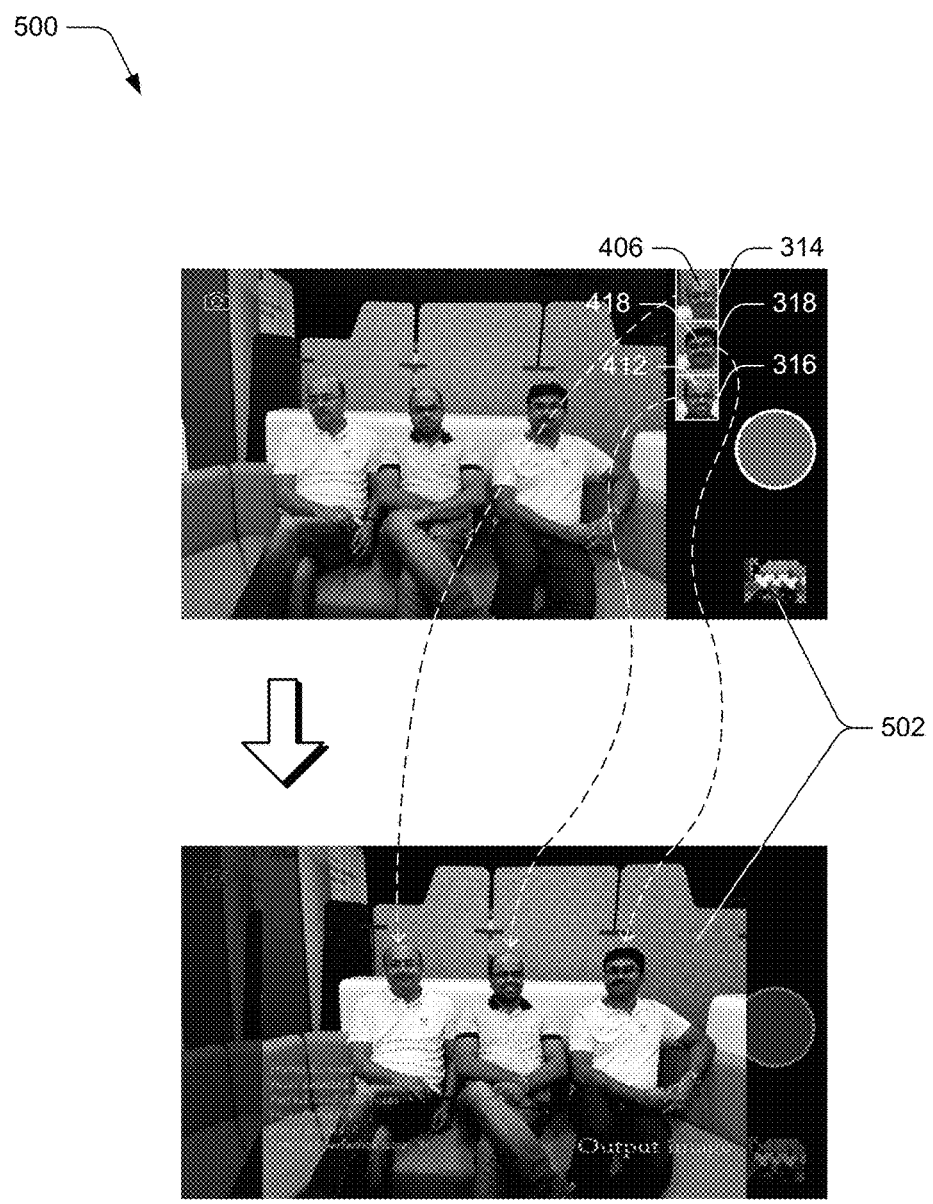
FIG. 5 illustrates an example implementation of generating an output image for display in accordance with one or more embodiments.

FIG. 2 illustrates an example of operation of the image-processing module 110 in greater detail. FIG. 3 illustrates an example implementation 300 of a user interface output by the computing device 102 in which a camera session is initiated for automatic capture and refinement of a group image. FIG. 4 illustrates an example implementation 400 of a user interface output by the computing device 102 in which candidate frames are updated. FIG. 5 illustrates an example implementation 500 of a user interface output by the computing device in which the group image is refined and an output image is generated for display. In portions of the following discussion, reference will be made interchangeably to FIGS. 2-5.

To begin with the image-processing module 110 of FIG. 2, the image-processing module 110 is illustrated as including a face detection module 202, a scoring module 204, a selection module 206, an alignment module 208, and a merging module 210. These modules can be implemented in hardware, software, firmware, or combination thereof.

The face detection module 202 is implemented at least partially in hardware of a computing device to analyze a live camera feed 212 during a camera session and detect faces included in frames of the live camera feed 212. In the example implementation 300, a user interface 302 of computing device 102 is used to present a live camera feed 212 showing a preview of a group of people 304 sitting together on a couch. To begin the process of automatically capturing and refining a group image, a user of the computing device 102 may enter a command, such as by pressing button 306. In response, the computing device 102 initiates a camera session and begins capturing frames from the live camera feed during the camera session. In implementations, the frames captured during the camera session are internally captured (e.g., cached) by the computing device 102. The face detection module 202 detects each face 308, 310, 312 and also various landmarks (e.g., eyes, cheeks, mouth, chin, etc.) associated with each face. For each frame captured, a position and size of each face is determined by the face detection module 202, along with positions and sizes of the landmarks of each face. From this, the face detection module 202 generates face data 214 representing the detected landmarks.

The scoring module 204 is implemented at least partially in hardware of a computing device to apply a set of rules to each captured frame to calculate, for each face in the frame, a set of scores corresponding to different factors 216 that are based on the landmarks in the face data 214. Some example factors 216 include probabilities associated with a smile 218, a head tilt 220, and eyes 222, each of which are described in more detail below. Using the set of scores, the scoring module 204 assigns a score to each face in the frame. The smile 218 probability represents whether the face is smiling. The head tilt 220 probability represents an orientation of the person's head, such as whether the person is facing the camera or the person's head is tilted to one side. The eyes 222 probability represents whether one or both eyes are open and/or looking toward the camera. Other factors 216 are also contemplated, and any of a variety of different factors can be utilized to score the face captured in the frame. Then, the scoring module 204 provides scores 224 for each face in each frame to the selection module 206.

The selection module 206 is implemented at least partially in hardware of a computing device to select a candidate frame 226 for each face and a reference frame 228 based on the scores 224 assigned to each face in each frame. In implementations, the selection module 206 selects an initial frame as the candidate frame 226 for that particular face. For example, candidate frame 314 is currently selected for face 308, candidate frame 316 is selected for face 310, and candidate frame 318 is selected for face 312. Each face can correspond to a different candidate frame. In some instances, a same frame can be selected as the candidate frame for multiple faces.

As additional frames are captured from the live camera feed, each face in each additional frame is scored and compared with a current candidate frame. If, in a next frame, a score for the same particular face is relatively higher than the score for that face in the current frame, then that next frame is cached as the corresponding candidate frame for the particular face to update the candidate frame 226 for that face. If, however, the score of the next frame for that particular face is relatively lower than the score of that face in the current frame, then the current frame is maintained as the candidate frame 226 for that particular face. As additional frames from the live camera feed are received, each additional frame is scored and compared with a currently selected candidate frame 226 for each face to update one or more of the candidate frames 226 based on respective scores.

In the example implementation in FIG. 4, after time t, person 402 in frame 404 is now smiling and looking toward the camera. Consequently, face 406 in the frame 404 is assigned a relatively higher score than the face 308 in the candidate frame 314 in FIG. 3. Because of this, the candidate frame 3141 is updated to include the face 406 from the frame 404. Further, if the score of the face 406 in the frame 404 is above a threshold value, then the face 406 may not be analyzed in subsequent frames of the live camera feed.

Because the subjects may smile at different times, the techniques herein continue to process the frames from the live camera feed until identifying the "best" representation for each face. For example, in frame 408, person 410 is now smiling and his face 412 is assigned a score that is relatively higher than his face 310 in the candidate frame 316. Accordingly, the candidate frame 316 is updated to include the face 412 from the frame 408. In frame 414, although the person 402 and the person 410 are no longer smiling, the respective corresponding candidate frames 314, 316 are mapped to the moment (e.g., frame) when their faces 406, 412 were smiling previously. Further in frame 414, person 416 now includes a "best" representation according to the score of his face 418, and the corresponding candidate frame 318 is updated to include the face 418 from the frame 414.

The candidate frame 226 is continually updated until identifying a frame having a score for that particular face that is above a threshold value. When such a frame is identified and selected as the candidate frame 226, then the updating of the candidate frame 226 for that particular face ceases because the threshold value represents an acceptable pose and position of the particular face. The selection module 206 continues to update candidate frames for the other faces until frames are located for each face based on each face's score being above the threshold value.

Similar techniques may also be used to select a reference frame 228 that is to serve as a base frame or canvas onto which to the faces from the candidate frames are combined. For example, as the frames are received, the reference frame is updated based on an overall score assigned to each frame. The overall score represents an overall level of quality of poses and positions of all the faces in the frame and is based on a combination of the scores of the faces in the frame. For instance a group image having two or more faces smiling and looking toward the camera can be assigned an overall score that is relatively higher than an overall score of a frame having only one face smiling and looking toward the camera. In implementations, the reference frame 228 is selected to represent a maximum number of faces with highest relative scores. The reference frame 228 is continuously updated during the camera session as additional frames are received and until all the candidate frames 226 for all the faces have been selected based on the threshold value. Then, once all the candidate frames 226 are selected, based on a threshold value, for all the faces in the live camera feed 212, the live camera feed 212 ceases and processing begins to generate a group image for output. The reference frame 228 and the candidate frames 226 are then provided to the alignment module 208.

After identification of the reference frame 228, the alignment module 208, implemented at least partially in hardware of a computing device, is employed to align the faces from the candidate frames 226 onto the reference frame 228. These frames are aligned to reduce errors in subsequent actions that may result from camera shake, subject movement, and so forth between the frames. Then, the alignment module 208 provides alignment data 230 to the merging module 210.

Subsequent to the alignment of the candidate frames and the reference frame 228, the merging module 210, implemented at least partially in hardware of a computing device, may be employed to merge the faces from the candidate frames 226 onto the reference frame 228 based on the alignment data 230. For example, the reference frame 228 is refined by merging the faces 406, 412, 418 from the candidate frames 314, 316, 318, respectively, onto the reference frame 228. Then, an output image 232 is generated and provided for display via the display device of the computing device 102. For example, by using the candidate frames merged with the reference frame, the output image 502 is generated having the "best" representation for each face in the image. The output image 502 can be presented as a thumbnail image, an icon, a selectable image in a gallery of images, a popup image, and overlay, and so on. Any suitable presentation method can be utilized to present the generated group image to the user. Using these techniques, the user can simply enter a user input to initiate a group mode, and the computing device automatically captures a "best" representation of each face in the feed and merges each face onto a final image to generate and output the perfect group image for display.

Example Procedures

The following discussion describes techniques for automatic capture and refinement of a group image without user intervention that may be implemented utilizing the previously described systems and devices. Generally, any of the components, modules, methods, and operations described herein can be implemented using hardware (e.g., fixed logic circuitry), firmware, software, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
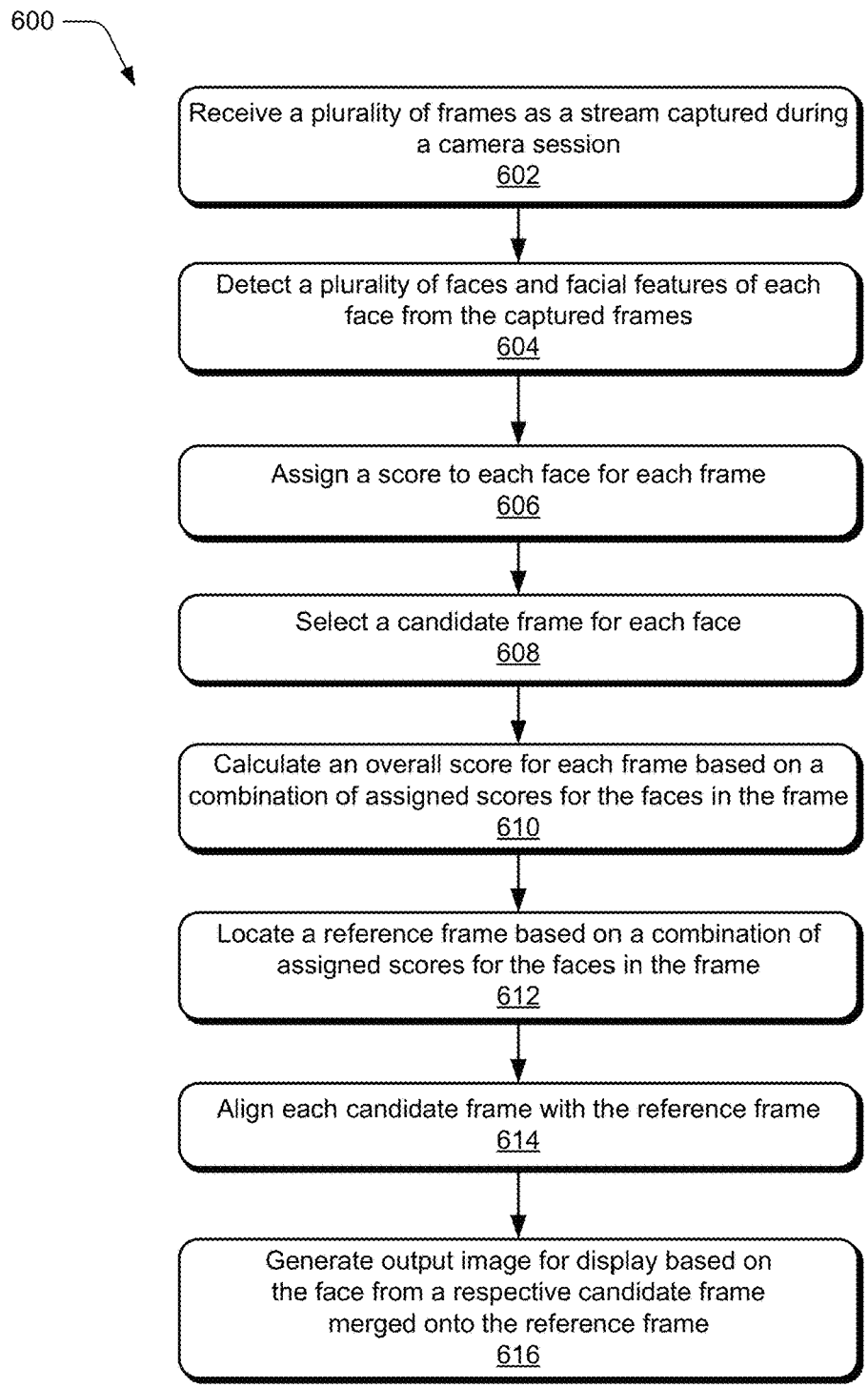
FIG. 6 describes an example procedure for automatic capture and refinement of a group image without user intervention in accordance with one or more embodiments.

FIG. 6 describes an example procedure 600 for automatic capture and refinement of a group image without user intervention in accordance with one or more embodiments. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

At 602, multiple frames are received as a stream captured during a camera session. In at least one implementation, the camera session is part of a live camera stream. Further, the stream can be captured during a group mode of a camera in which the frames are captured automatically and without user intervention.

At 604, multiple faces and landmarks of each face from the frames captured during a camera session are detected. Any suitable face detection technique can be used to detect the faces in the frames along with various landmarks (e.g., cheeks, eyes, chin, lips, mouth, and so on) associated with each face.

At 606, a score is assigned to each face for each frame. In implementations, the score is based on the detected facial features of each face. For example, the facial features can be used to determine a variety of factors associated with a particular face. For example, a person's lips and mouth shape can be used to determine whether the person is smiling. In another example, the person's eye features can be used to determine whether their eyes are open. Accordingly, the score can be based on a wide variety of facial features.

At 608 a candidate frame for each face is selected from the frames. In implementations, the candidate frame is selected based on the assigned score for a respective face. Further, the score can be associated with the landmarks and compared with a threshold value. For instance, each face in each frame is assigned a score based on corresponding landmarks. Then, the candidate frame is selected from among the frames that have been captured until that time t. The candidate frame is selected for a particular face as a frame having a highest relative score for that face, until time t.

At 610, an overall score is calculated for each frame of the frames based on a combination of assigned scores for the faces in the frame. The overall score represents an overall quality of the frame based on the faces in the frame and their respective positions and poses. For example, a first frame having two of three faces smiling and looking toward the camera may be assigned a relatively higher overall score than a second frame that only has one of three faces smiling and looking toward the camera.

At 612, a reference frame is located from the frames based on the overall score for a respective frame. In implementations, a relatively highest overall score represents a maximum relative number of faces with highest relative scores. Accordingly, the overall scores of the frames are compared and a frame having the highest relative overall score from among all the frames is selected as the reference frame. At 614, each candidate frame is aligned with the reference frame. For example, each candidate frame is aligned based on a particular face in the candidate frame to match that particular face with a corresponding face in the reference frame.

At 616, an output image is generated by merging faces from the candidate frames onto the reference frame. For instance, each face is merged onto the reference frame using the face's corresponding candidate frame. In at least some implementations, the faces merged onto the reference frame may include a subset of the faces in the frame if the reference frame already includes a "best" representation of one or more of the faces. Accordingly, the "best" representation for each face is used, either from the reference frame or from the corresponding candidate frame.

Figure 7:
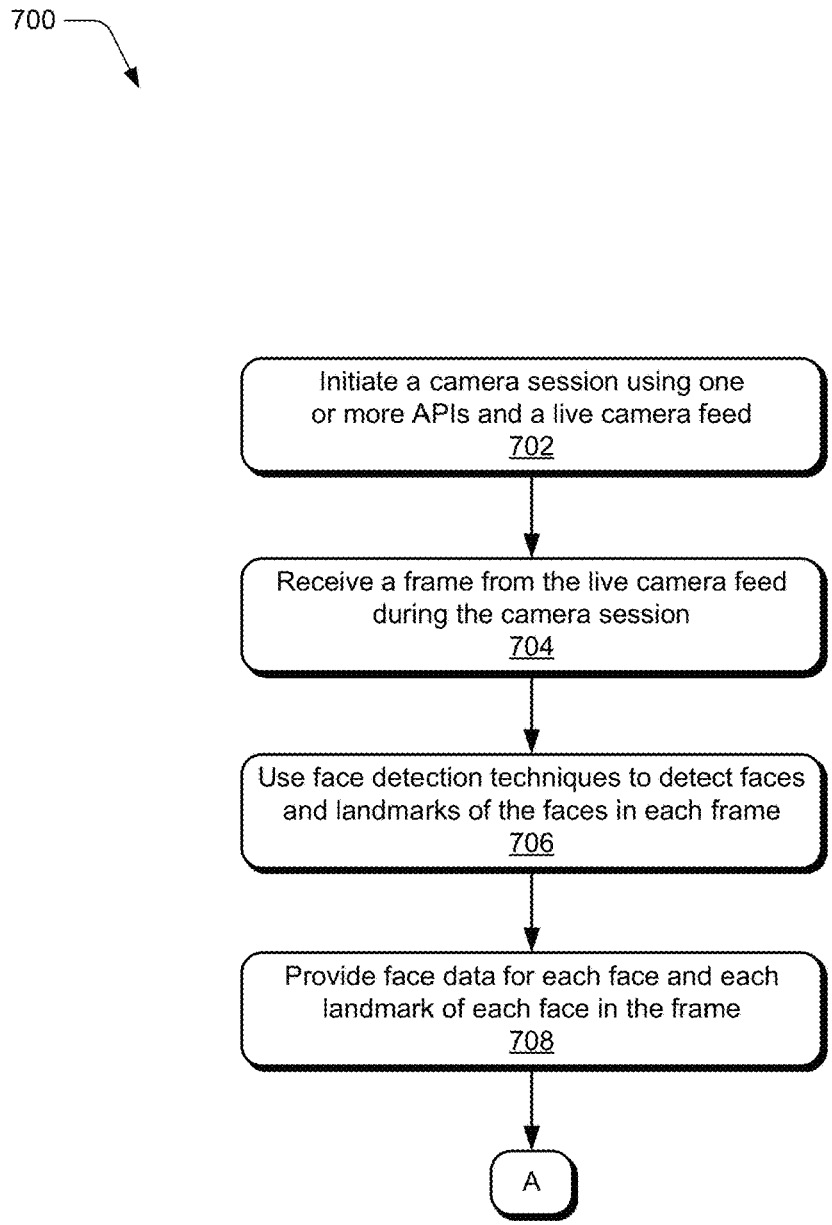
FIG. 7 describes an example procedure for face and landmark detection in accordance with one or more embodiments.

FIG. 7 describes an example procedure 700 for face and landmark detection in accordance with one or more embodiments. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

At 702, a camera session is initiated using one or more APIs and a live camera feed. For example, a camera can be initiated to show a preview (e.g., live camera feed) of a scene capable of being captured by the camera. During the camera session, frames are previewed at a predefined rate, such as 30 frames per second, and a preview resolution can be set, either by a predefined setting or by a user input. Any suitable frame rate and resolution can be utilized to preview the frames.

At 704, a frame from the live camera feed is received during the camera session. For example, during the camera session, the frame can be captured from the live camera feed and analyzed automatically and without user intervention. For instance, a user input is not required to initiate the capture of the frame during the camera session. In addition, capture resolution for the camera can be set, such as by a predefined setting or by a user input.

At 706, face detection techniques are used to detect faces and landmarks of faces in the captured frame. In implementations, the face detection techniques include a face detector unit. Any suitable face detector unit can be utilized. One example face detector unit utilizes a Haar feature-based cascade classifier to detect the faces in the frame as well as different landmarks associated with respective faces. In implementations, the landmarks include specific regions of the face, such as eyes, cheeks, mouth, lips, nose, chin, and so on. These landmarks are detected for each individual face in the frame. The classifier may be trained using a large number of positive data sets (images of faces) and negative data sets (images without faces) to enable the classifier to quickly detect different landmarks and their associated positions and orientations.

At 708, face data for each face and each landmark of each face in the frame is provided. For instance, the face detection module 202 can provide the face data to the scoring module 204 for further processing at "A", which is described in detail with respect to FIG. 8. This process is then repeated for a next frame captured from the live camera feed, which may be any subsequently captured frame that is captured during the camera session.

Figure 8:
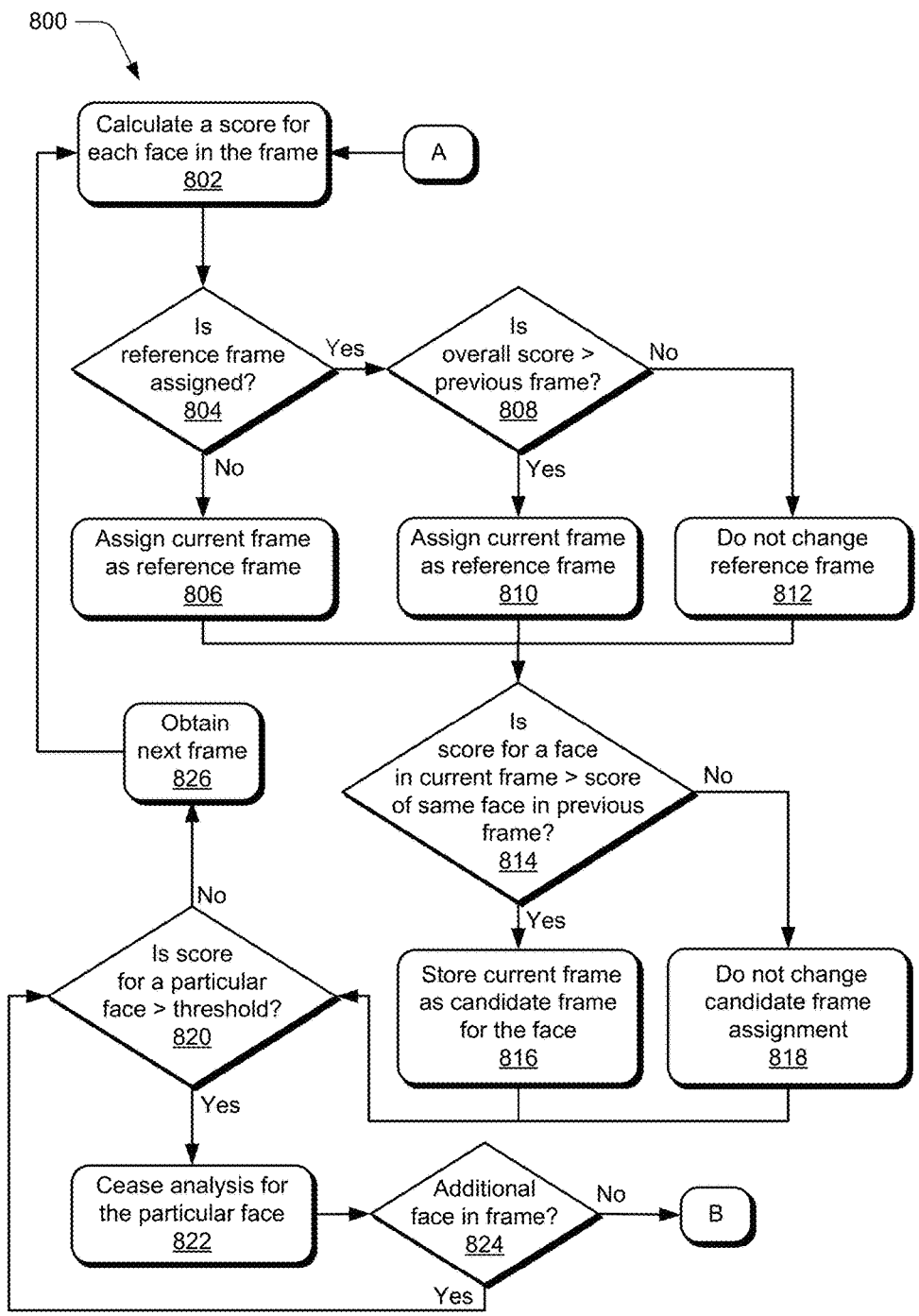
FIG. 8 describes an example procedure for selecting candidate frames and a reference frame in accordance with one or more embodiments.

FIG. 8 describes an example procedure 800 for selecting candidate frames and a reference frame in accordance with one or more embodiments. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

Continuing with the example procedure 700 described with respect to FIG. 7, a first frame received from the face detection module 202 is assigned as an initial candidate frame for all the faces in the frame. Then, when a second frame is received, the second frame is compared with the first frame using the procedure 800.

At 802, a score is calculated for each face in a current frame (e.g., the second frame mentioned above). The score represents a measure of image quality of a particular face in the frame with respect to various landmarks. In implementations, the score ($Ps_i$) for each individual face (i) in the frame can be calculated using the following equation:

$$Ps_i = 0.6 \ast Sc_i + 0.2 \ast Ez_i + 0.1 \ast Le_i + 0.1 \ast Re_i \quad \text{Equation 1}$$

In Equation 1, the term $Sc_i$ may refer to a smiling probability of the face i in the frame, the term $Ez_i$ may refer to a Euler Z angle (also referred to as a "tilt angle") of the face i in the frame, the term $Le_i$ may refer to a left eye open probability for the face i, and the term $Re_i$ may refer to a right eye open probability for the face i. The Euler Z angle indicates an amount that the face is tilted from a reference position, such as a vertical axis. In Equation 1, relatively more weight is given to the smiling probability because smiles are generally desired when people are posing for a group image. Relatively less weight is given to the tilt angle to allow for subjects posing with their head tilted. The weights in Equation 1, however, are example weights that are not intended to be limiting, but are used herein as example weights for the calculation of $Ps_i$. Accordingly, any suitable weights can be utilized in the calculation of the $Ps_i$. Furthermore, the weights can be adjusted based on a user input, such as a user input selecting a predefined setting or mode, or interacting with a control that modifies one or more of the weights. Alternatively or in addition, the weights can be adjusted automatically, such by automatically modifying one or more of the weights based on one or more aspects the scene.

The combined score of the smiling, tilt angle, left eye open, and right eye open probabilities results in the score for a particular face. Thus, for n faces in the frame, an overall score for the frame is determined by calculating a mean of the scores of the n faces in the frame. Thus, a higher overall score represents a more "perfect" frame.

At 804, it is determined whether the reference frame has been assigned. If not ("NO"), then at 806, the current frame is assigned as the reference frame. If the reference frame has previously been assigned ("YES"), then at 808, it is determined whether the overall score of the current frame is greater than an overall score of a previous frame. If the overall score of the current frame is greater ("YES"), then at 810 the current frame is assigned as the reference frame. However, if the overall score of the current frame is not greater than the previous frame's overall score ("NO"), then at 812, the reference frame assignment remains unchanged.

At 814, it is determined, for each face in the frame, whether the score for that face in the current frame is greater than the score of that same face in the previous frame. If the score of that face is relatively higher than a score of the same face in the previous frame ("YES"), then at 816 the current frame is stored as the latest "best" candidate frame for that particular face effective to replace the previous frame with the current frame as an updated candidate frame. Otherwise ("NO"), at 818 the candidate frame for that particular face is not changed.

At 820, it is determined, for each face in the frame, whether the score is greater than a threshold. Any suitable value can be used for the threshold. The threshold represents an acceptable face position and pose. The threshold can include a predefined value, or can be manually defined by a user input. In implementations, the threshold can be adjusted by the user of the camera to raise or lower the acceptable face position and pose. If the score for a particular face is greater than the threshold ("YES"), then at 822 the analysis for that particular face ceases. At 824, it is determined whether an additional face is included in the frame. If the frame includes another face ("YES"), then the procedure 800 returns to 820 to determine whether the score for the additional face is greater than the threshold. This process repeats for each face in the frame. If any of the faces in the frame includes a score that is less than the threshold, then at 826 a next frame is obtained and the procedure 800 returns to 802 to analyze the next frame with respect to the face(s) having scores that did not reach the threshold.

When each and every face in the frame includes a score that is greater than the threshold ("NO" at 824), indicating that a "best" candidate frame has been selected for each face, then the process continues to "B", which is described in detail below with respect to FIG. 9.

Using the techniques described herein, the candidate frames and the reference frame continue being updated if the current frame scores are relatively higher until reaching the threshold. This also ensures that a maximum N+1 frames are cached, where N refers to a total number of faces detected. Using these techniques helps in optimizing memory of the computing device 102, particularly for mobile devices.

Figure 9:
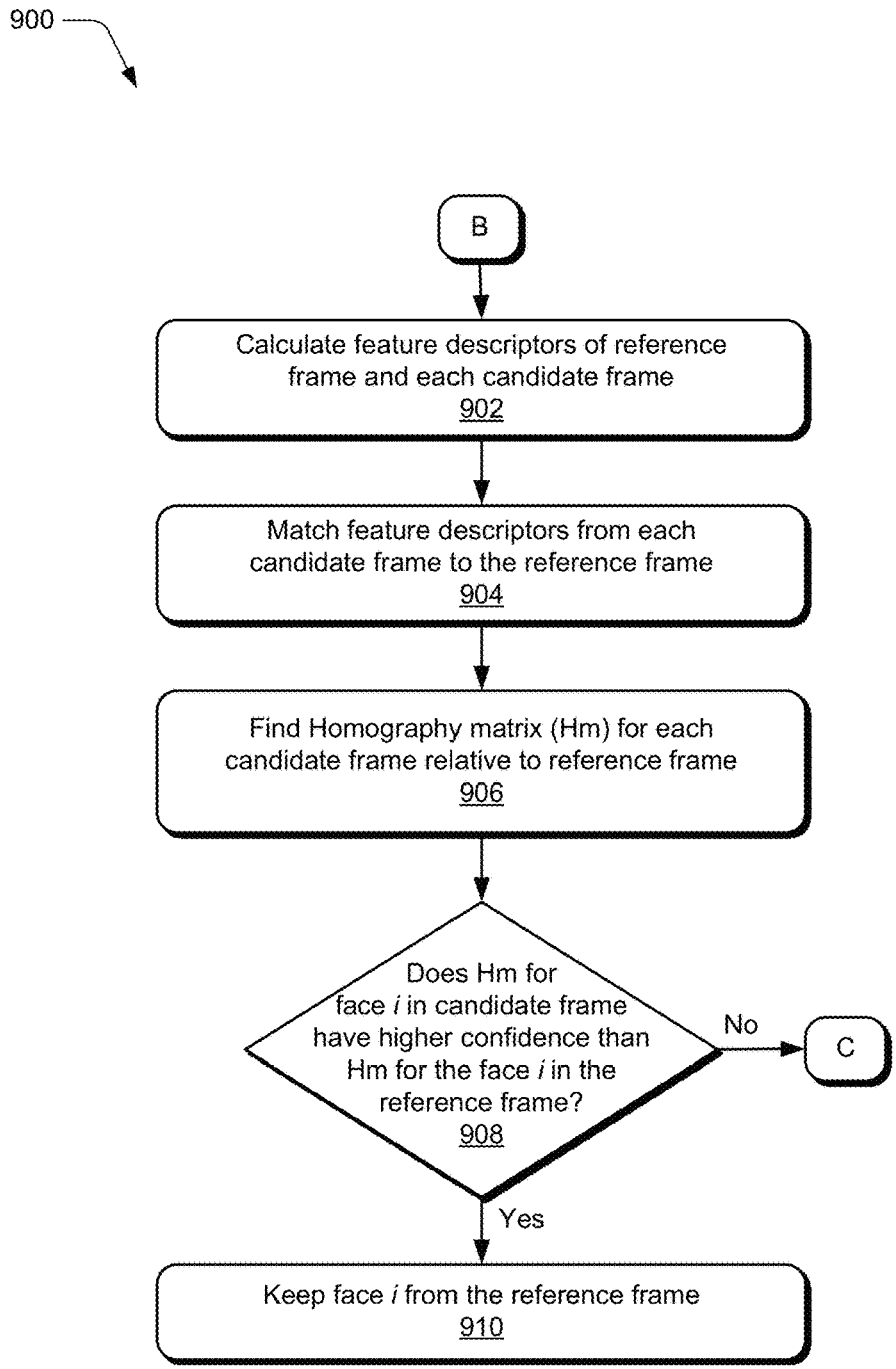
FIG. 9 describes an example procedure for aligning candidate frames with the reference frame in accordance with one or more embodiments.

FIG. 9 describes an example procedure 900 for aligning candidate frames with a reference frame in accordance with one or more embodiments. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

Continuing at "B", at 902 feature descriptors of the reference frame and of each candidate frame are calculated. Any suitable technique can be utilized to calculate the feature descriptors of the faces in the reference frame and each candidate frame. In implementations, an Oriented FAST and Rotated Brief (ORB) feature detector can be utilized to detect the feature descriptors of the faces. At 904, the feature descriptors from each candidate frame are matched to the reference frame. At 906, a homography matrix (Hm) for each candidate frame is determined relative to the reference frame. The Hm relates pixel coordinates between the candidate frame and the reference frame. Then, at 908, it is determined whether the Hm for a face i in the candidate frame has a higher relative confidence level than the Hm for the corresponding face i in the reference frame. If the confidence level is relatively higher ("YES"), then the face i from the reference frame is used as the "best" representation for the face i. Otherwise, if the confidence level is not higher ("NO") than a corresponding confidence level in the previous frame, then the procedure 900 continues to "C", which is discussed in detail with respect to FIG. 10, to merge the face from the candidate frame onto the reference frame.

Figure 10:
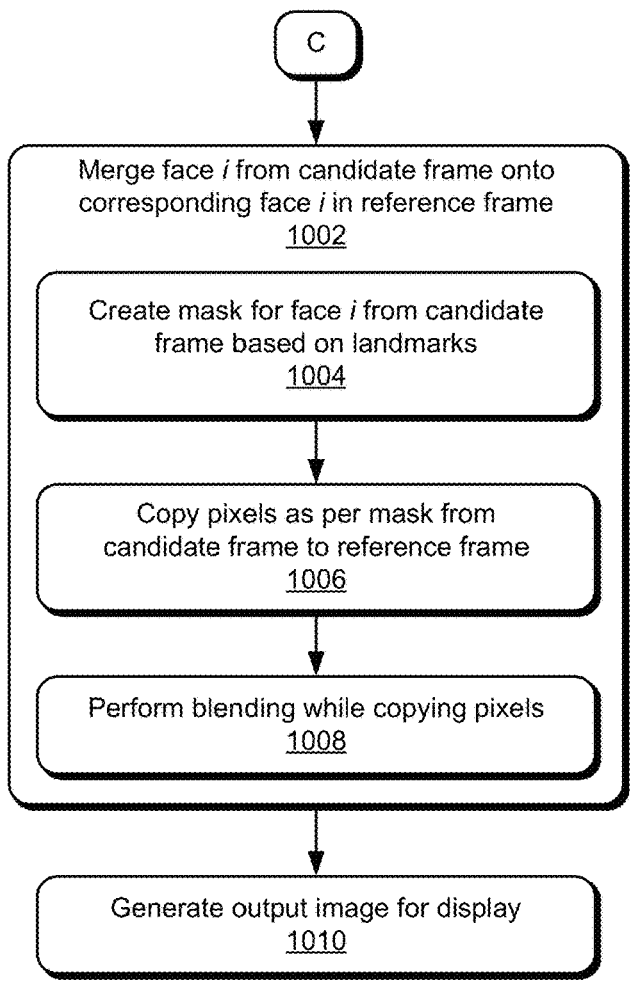
FIG. 10 describes an example procedure for merging candidate frames with the reference frame to generate an output image in accordance with one or more embodiments.

FIG. 10 describes an example procedure 1000 for merging candidate frames with the reference frame to generate an output image in accordance with one or more embodiments. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

Continuing at "C", at 1002 the face i is merged from the candidate frame onto the corresponding face i in the reference frame. To do this, at 1004 a mask is created for the face i from the candidate frame based on the landmarks. For example, eye positions, cheek positions, lip positions, and chin position can be used to create the mask such that only inner portions of the face are covered. Then, at 1006 pixels are copied as per the mask from the candidate frame to the reference frame. Potential errors that can occur when copying pixels are reduced based on the alignment that was previously performed between the face in the candidate frame and the corresponding face in the reference frame.

At 1008, blending is performed while copying the pixels. Any suitable blending operation can be performed. For example, Poisson blending can be performed while copying the pixels to account for different color and/or exposure values between the captured frames. Chances of different exposure values decrease the closer in time that frames of the same scene are captured. Then, at 1010 an output image is generated for display. The output image includes the "best" representation of each face that was captured during the camera session, whether captured in the reference frame or merged onto the reference frame from the candidate frame.

The above-described method constitutes an improvement over current approaches which use a primarily post-processing approach to extract images from videos. The automated nature of the described embodiments provides a fast, efficient and easily scalable solution. That is, through the use of automated rules of the particular types discussed herein, group images having all the people in the group smiling and looking toward the camera at the same moment with their eyes open, can be more quickly and efficiently captured and provided to end users. For example, in scenarios in which people are gathered for a group image, the automated process can allow for quick and easy capture of a "best" position and pose of each face in the group, even if some of the people are not smiling or looking toward the camera at the same moment. As discussed above, a perfect group image is generated using different frames of a live camera feed captured during a camera session. This would be difficult if not impossible if the operations were to be performed manually because manually identifying a "best" group image from multiple captured group images is a slow and arduous process, particularly for post-processing image editing by average users who lack expertise in image editing techniques. Moreover, the automated rules promote scalability by removing the need for human intervention, such as adding additional humans to perform the arduous manual process.

Example System and Device

Figure 11:
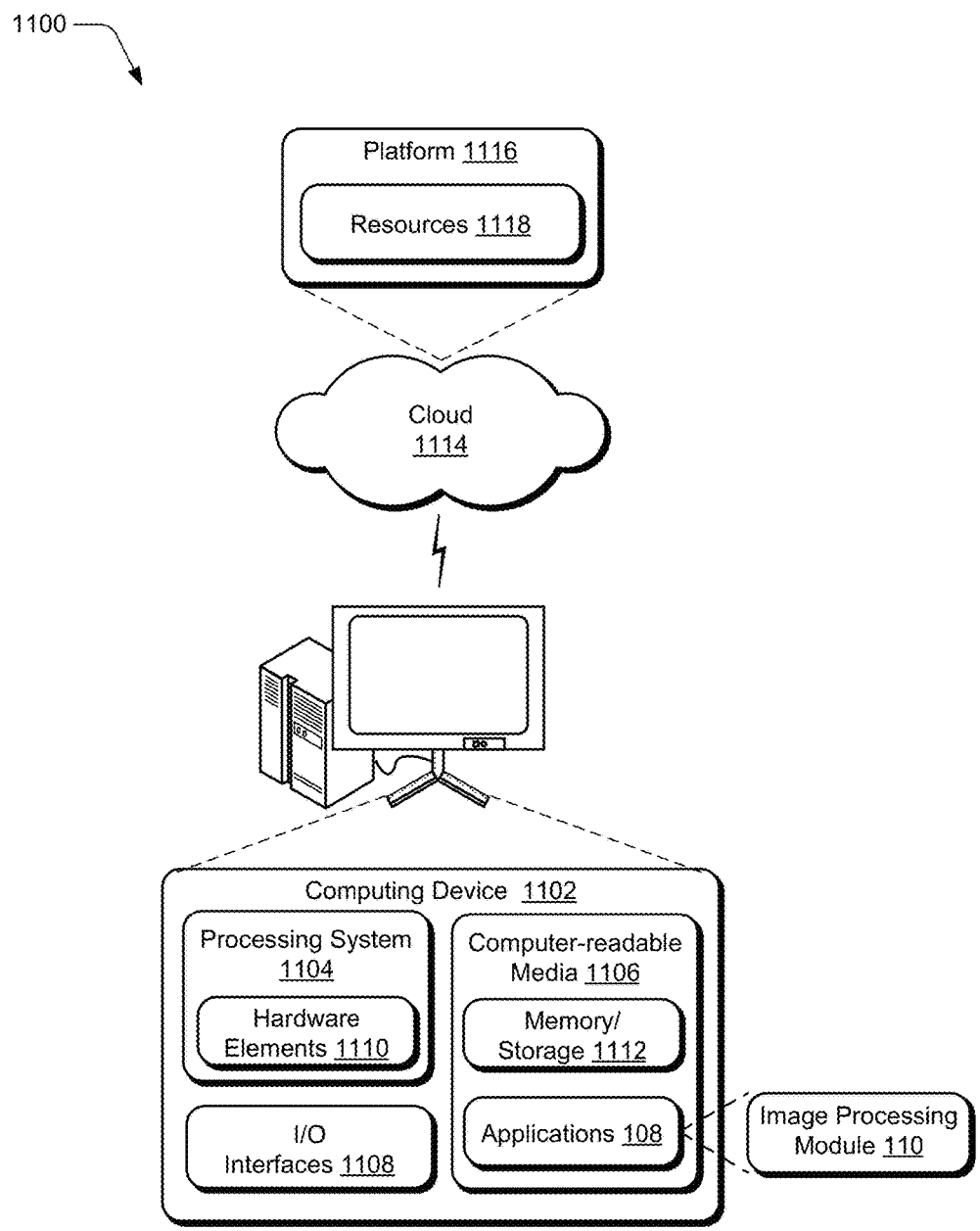
FIG. 11 illustrates an example system including various components of an example device that can be employed for one or more implementations described herein.

FIG. 11 illustrates an example system generally at 1100 that includes an example computing device 1102 that is representative of one or more computing systems and/or devices that may implement the various techniques described herein. This is illustrated through inclusion of the applications 108 and, in particular, the image-processing module 110, which operates as described above. The computing device 1102 may be, for example, a server of a service provider, a device associated with a client (e.g., a client device), an on-chip system, and/or any other suitable computing device or computing system.

The example computing device 1102 is illustrated as including a processing system 1104, one or more computer-readable storage media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable storage media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable storage media 1106 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources may include applications and/or data that can be utilized while computer processing is executed on servers that are remote from the computing device 1102. Resources can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources that are implemented via the platform 1116. Accordingly, in an interconnected device implementation, implementation of functionality described herein may be distributed throughout the system 1100. For example, the functionality may be implemented in part on the computing device 1102 as well as via the platform 1116 that abstracts the functionality of the cloud 1114.

Conclusion

Various embodiments detect faces in frames captured during a camera session of a live camera feed. Then, for each individual face, a candidate frame is selected to represent a "best" representation of that face based on a score compared with a threshold value. In addition, a reference frame is selected from the frames based on a maximum relative number of faces with highest relative scores. The particular face from each candidate frame is then merged onto the reference frame, and an output image is generated for display.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to refine a group image automatically and without user intervention by a computing device, a method comprising:
   receiving, by the computing device, a plurality of frames as a stream captured during a camera session;
   detecting, by the computing device, a plurality of faces and a plurality of facial features of each face of the plurality of faces from the received plurality of frames;
   assigning, by the computing device, a score to each face of the plurality of faces for each frame of the plurality of frames, the score based on the detected plurality of facial features;
   selecting, by the computing device, a candidate frame from the plurality of frames for each face of the plurality of faces, the selecting based on the assigned score for a respective said face;
   calculating, by the computing device, an overall score for each frame of the plurality of frames based on a combination of assigned scores for the plurality of faces in the frame;
   locating, by the computing device during the camera session, a reference frame from the plurality of frames based on the overall score for a respective said frame;
   creating, by the computing device, a mask for a respective said face in a respective candidate frame of the plurality of candidate frames based on respective said facial features; and
   generating, by the computing device, an output image for display by merging faces from the candidate frames onto the reference frame by copying pixels based on the respective said mask from the respective said face in the respective candidate frame to a corresponding said face in the reference frame.

2. A method as described in claim 1, further comprising, prior to generating the output image, aligning each said candidate frame with the reference frame by at least matching feature descriptors of respective said faces in the candidate frames with feature descriptors of corresponding said faces in the reference frame.

3. A method as described in claim 1, wherein the stream is captured in real time during the camera session of a live camera feed, wherein the operations of detecting, assigning, selecting, calculating, locating, and generating are performed in real time during the camera session.

4. A method as described in claim 1, wherein the plurality of facial features includes at least one of a chin, lip, nose, eye, or cheek.

5. A method as described in claim 1, wherein the candidate frame is selected by at least:
comparing, by the computing device, an initial frame from the plurality of frames with a next frame from the plurality of frames; and
responsive to a determination by the computing device that a respective said face in the next frame has a higher relative score than an assigned score of the respective said face in the initial frame, storing the next frame as the candidate frame for the respective said face.

6. A method as described in claim 1, further comprising:
determining, by the computing device and based on the plurality of facial features, at least one of a smiling probability of each face, a tilt angle of each face, a left eye open probability for each face, or a right eye open probability for each face; and
responsive to the determining, computing the score for each face.

7. A method as described in claim 1, wherein the detecting, the selecting, the assigning, the calculating, the locating, and the generating are performed by the computing device automatically and without user intervention.

8. A method as described in claim 1, further comprising wherein the candidate frame is selected by at least:
determining, by the computing device, a homography matrix for the reference frame and a candidate frame, relating pixel coordinates between the candidate and reference frame;
comparing, by the computing device, a confidence level based on the homography matrix of the candidate frame with a confidence level based on the homography matrix of the reference frame; and
responsive to a determination by the computing device that a respective said face in the candidate frame does not have a higher confidence level than an assigned confidence level of the respective said face in the reference frame, merge the face from the candidate frame onto the reference frame.

9. In a digital medium environment to refine a group image by a computing device automatically and without user intervention, a system comprising an image-processing module implemented at least partially in hardware of a computing device, the image-processing module configured to:
receive a plurality of frames as a stream captured during a camera session;
detect a plurality of faces and a plurality of facial features of the plurality of faces from the received plurality of frames;
calculate a score for each face of the plurality of faces for each frame of the plurality of frames based on the plurality of facial features;
store a candidate frame from the plurality of frames for each face of the plurality of faces based on the assigned score for a respective said face;
for a particular face of the plurality of faces, update the candidate frame with an additional frame received subsequent to the candidate frame during the camera session based on the score for the particular face in the additional frame being relatively higher than the score for the particular face in the candidate frame; and
generate a mask for the particular face in the updated candidate frame based on facial features associated with the particular face, and
merge pixels from the particular face onto another frame of the plurality of frames to generate an output image based on a combination of content from the other frame and the particular face from the updated candidate frame.

10. A system as described in claim 9, wherein the image-processing module is further configured to align the updated candidate frame with the other frame based on feature descriptors of the particular face in the updated candidate frame being matched to additional feature descriptors of the particular face in the other frame.

11. A system as described in claim 9, wherein the stream is captured during the camera session of a live camera feed.

12. A system as described in claim 9, wherein the plurality of facial features include at least one of a chin, lip, nose, eye, or cheek.

13. A system as described in claim 9, wherein the image-processing module is further configured to merge the updated candidate frame onto the other frame based on the pixels from the particular face in the candidate frame being copied as per the mask to the particular face in the other frame.

14. A system as described in claim 9, wherein the image-processing module is further configured to:
assign an overall score to each frame of the plurality of frames based on a combination of assigned scores for the plurality of faces in the frame;
locate the other frame from the plurality of frames based on the overall score for a respective said frame; and
generate an output image for display based on faces from the candidate frames merged onto the other frame.

15. A system as described in claim 9, wherein the image-processing module is further configured to:
determine, based on the plurality of facial features, at least one of a smiling probability of each face, a tilt angle of each face, a left eye open probability for each face, or a right eye open probability for each face; and
compute the score for each face based on the determination.

16. In a digital medium environment to refine a group image automatically and without user intervention, a system comprising:
means for initiating a camera session for capturing a plurality of frames as a stream;
means for detecting a plurality of faces and a plurality of facial features of each face of the plurality of faces from the received plurality of frames during the camera session;
means for assigning a score to each face of the plurality of faces for each frame of the plurality of frames, the score based on the detected plurality of facial features;
means for selecting a candidate frame from the plurality of frames for each face of the plurality of faces, the selecting based on the assigned score for a respective said face;

means for updating the selected candidate frame for a particular face of the plurality of faces by selecting an additional frame of the received plurality of frames based on a comparison of a first assigned score of the particular face in the selected candidate frame and a second assigned score of the particular face in the additional frame; and means for generating an output image for display by merging pixels of faces from the candidate frames into a single image.

17. A system as described in claim 16, further comprising:

means for determining, for each face of the plurality of faces from the plurality of frames, at least one of a smiling probability, a head tilt, a left eye open, or a right eye open based on the plurality of facial features; and means for calculating the score for each face based on the determining.

18. A system as described in claim 16, further comprising:

means for calculating an overall score for each frame of the plurality of frames based on a combination of assigned scores for the plurality of faces in the frame; and means for locating a reference frame from the plurality of frames based on the overall score for a respective said frame.

19. A system as described in claim 16, wherein the merging means further comprises:

means for copying the pixels as per the mask from the faces represented by the candidate frames to corresponding faces in the reference frame.

20. A system as described in claim 16, further comprising:

means for comparing an initial frame from the plurality of frames with a next frame from the plurality of frames; and means for, responsive to an identified face in the next frame having a higher relative score than an assigned score for the identified face in the initial frame, storing the next frame as the candidate frame for the particular face.

* * * * *